US011950973B2

(12) United States Patent
Newsham

(10) Patent No.: US 11,950,973 B2
(45) Date of Patent: *Apr. 9, 2024

(54) PATIENT ANXIETY MANAGEMENT SYSTEM AND METHOD OF USE

(71) Applicant: David Newsham, Rialto, CA (US)

(72) Inventor: David Newsham, Rialto, CA (US)

(*) Notice: Subject to any disclaimer, the term of this patent is extended or adjusted under 35 U.S.C. 154(b) by 296 days.

This patent is subject to a terminal disclaimer.

(21) Appl. No.: 17/331,573

(22) Filed: May 26, 2021

(65) Prior Publication Data

US 2021/0369401 A1 Dec. 2, 2021

Related U.S. Application Data

(63) Continuation of application No. 16/887,783, filed on May 29, 2020, now Pat. No. 11,051,908.

(51) Int. Cl.
*A61C 1/07* (2006.01)
*A61C 1/00* (2006.01)

(52) U.S. Cl.
CPC .............. *A61C 1/07* (2013.01); *A61C 1/0023* (2013.01); *A61C 1/0046* (2013.01); *A61C 2203/00* (2013.01)

(58) Field of Classification Search
CPC ....... A61C 1/07; A61C 1/0023; A61C 1/0046; A61C 2203/00
See application file for complete search history.

(56) References Cited

U.S. PATENT DOCUMENTS

| | | | |
|---|---|---|---|
| 2,648,043 A * | 8/1953 | Grogl | A61C 1/0007 318/551 |
| 4,767,327 A | 8/1988 | Smithwick | |
| 4,810,996 A | 5/1989 | Glen | |
| 5,542,138 A | 8/1996 | Williams | |
| 5,877,675 A | 3/1999 | Rebstock | |
| 6,249,703 B1 | 6/2001 | Stanton | |
| 6,445,299 B1 | 9/2002 | Rojas, Jr. | |
| 6,873,268 B2 | 3/2005 | Lebel | |
| 7,042,337 B2 | 5/2006 | Boarders | |
| 7,927,099 B2 | 4/2011 | Edwards | |
| 8,175,720 B2 | 5/2012 | Skelton | |
| 8,487,771 B2 | 7/2013 | Hsieh | |
| 9,070,282 B2 | 6/2015 | Clough | |
| 9,242,104 B2 | 1/2016 | Hamann | |
| 9,669,219 B2 | 6/2017 | Caparso | |
| 11,051,908 B1 * | 7/2021 | Newsham | A61C 19/00 |

(Continued)

*Primary Examiner* — Ralph A Lewis

(74) *Attorney, Agent, or Firm* — JAFARI LAW GROUP, INC.

(57) ABSTRACT

The present disclosure relates to a patient anxiety management system for managing patient anxiety during a dental procedure. In one example, a patient anxiety management system is presented. The patient anxiety management system includes a control module that a patient can use to disactivate a medical device used by a dental professional by way of a trigger mechanism. Upon deactivating the medical device, a recording device, in communication with the control module, plays a recorded message to the patient during a programmable timeframe. Once the patient is calm, the system resets the medical device to an initial operation state by reconnecting but not reactivating the medical device so that the dental professional may resume the procedure when it is safe to proceed.

15 Claims, 7 Drawing Sheets

(56) References Cited

U.S. PATENT DOCUMENTS

| | | |
|---|---|---|
| 2004/0230246 A1 | 11/2004 | Stein |
| 2004/0235446 A1 | 11/2004 | Flaharty |
| 2006/0092029 A1 | 5/2006 | Browne |
| 2007/0060869 A1 | 3/2007 | Tolle |
| 2007/0270921 A1 | 11/2007 | Strother |
| 2008/0091142 A1 | 4/2008 | Trombley |
| 2010/0052892 A1 | 3/2010 | Allen |
| 2012/0165640 A1 | 6/2012 | Galley |
| 2014/0085082 A1 | 3/2014 | Lyon |
| 2014/0125479 A1 | 5/2014 | Schmidt |
| 2015/0185807 A1 | 7/2015 | Okuzono |
| 2016/0042623 A1 | 2/2016 | Riley |

\* cited by examiner

US 11,950,973 B2

PATIENT ANXIETY MANAGEMENT SYSTEM AND METHOD OF USE

PRIORITY

This application is a continuation of U.S. nonprovisional application Ser. No. 16/887,783, filed on May 29, 2020.

TECHNICAL FIELD OF THE INVENTION

The present disclosure relates to dentistry. Specifically, the present disclosure relates to a patient anxiety management system and a method of using the same to perform dental care with special care dentistry patients that may suffer from anxiety during treatment.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Dentistry, also known as dental medicine and oral medicine, is a branch of medicine that consists of the study, diagnosis, prevention, and treatment of diseases, disorders, and conditions of the oral cavity, commonly in the dentition but also the oral mucosa, and of adjacent and related structures and tissues, particularly in the maxillofacial (jaw and facial) area. Dental treatments are carried out by a dental team, which often consists of a dentist and dental auxiliaries (dental assistants, dental hygienists, dental technicians, as well as dental therapists). While going for treatment may be routine for most patients, some individuals have an abnormal fear or anxiety of going for dental treatment.

Dental anxiety is indicative of a state of apprehension that something dreadful is going to happen in relation to dental treatment, and it is usually coupled with a sense of losing control. This dental anxiety can be debilitating for some patients, to the point that treatment by a dentist becomes prohibitive. Often, a vicious cycle is created in which dental fear causes the patient to delay seeking dental treatment. The patient naturally develops dental problems for failure to attend to their oral needs, and symptoms worsen typically increasing their anxiety and fear of treatment.

Accordingly, oral medicine professionals have developed techniques, devices, and systems for alleviating at least some of that anxiety to facilitate their treatment. Because dental anxiety often stems from or otherwise involves the patient's sense of losing control, dental professionals have previously attempted to provide some control back to the patients. However, for various reasons, those systems have not adequately addressed the problem.

For example, U.S. Pat. No. 2,648,043 issued to Grogl describes a dental hand piece whereby a patient in whose mouth the dentist is operating may send a signal to the dentist or may stop the tool the dentist is using. That system signals or stops the tool by breaking a circuit to the tool by activating an auxiliary switch that sends a signal to the circuit. U.S. Pat. No. 7,927,099 issued to Edwards seems to be an improvement over prior art designs. In this version, a dental patient can use a hand-held device to instantaneously halt rotation of a dental drill, by activating a pneumatic (air) switch on the hand-held device. The dentist can push another button to start the drill again. Wireless networking may also be employed with this device. U.S. Pat. No. 4,767,327 to Smithwick describes a Dental Patient Control Mechanism, whereby if a dental patient feels pain, the patient can deactivate the dental unit by manually controlling a valve to send an air signal which deactivates the dental unit. U.S. Pat. No. 4,810,996 issued to Glen describes a handheld device for a dental patient, held freely in the patient's hand, having alarm button(s) and an audible alarm circuit, which device can emit distinct sounds, each sound indicating a level of pain/discomfort that the patient is feeling.

Although these devices provide some sense of control to the patient, there are various shortcomings and problems not addressed by these devices, which makes them inadequate for treating patient anxiety in the field of dentistry. For example, one problem with some of these systems is that there is no safety control for the doctor or professional to restart the procedure interrupted by the patient. That is, while the patient may stop the procedure, if there is any hesitation by the patient or miscommunication between doctor or professional and the patient, the hand tool may be inadvertently reactivated exposing the patient to being harmed by the handpiece or device being used by the professional.

Another problem is that these systems do not seem to treat or meaningfully address the patient's anxiety. For example, while providing the patient with some control over the procedure they are undergoing may alleviate some anxiety, these systems merely offer a stop-and-go type of approach that may in fact prolong the procedure frustrating the patient, and even exacerbating the patient's anxiety.

Therefore, there is a need to develop an improved patient anxiety management system and method to solve the above-mentioned problems. It is to these ends that the present invention has been developed.

SUMMARY OF THE INVENTION

The teachings disclosed herein relate to a patient anxiety management system for managing patient anxiety during a dental procedure, including methods performed by the system and methods for using the same.

Generally, the invention is a patient anxiety management system that includes a control module that a patient can use to disactivate a medical device used by a dental professional by way of a trigger mechanism. Upon deactivating the medical device, a recording device, in communication with the control module, plays a recorded message to the patient during a programmable timeframe. Once the patient is calm, the system resets the medical device to an initial operation state by reconnecting but not reactivating the medical device so that the dental professional may resume the procedure when it is safe to proceed.

In one example, a patient anxiety management system for managing patient anxiety during a dental procedure is presented. The patient anxiety management system may include a control module in communication with a medical device or a medical device interface; a trigger in communication with the control module and configured to deactivate the medical device or medical device interface; and a patient distraction module, in communication with the control module, configured to provide the patient with auditory stimuli, wherein the control module is configured to: activate a programmable time delay relay; deactivate the medical device or medical device interface for a programmable timeframe; activate the patient distraction module to play the auditory stimuli during the programmable timeframe; and reset the medical device or medical device interface to an initial operation state.

In another example, a patient anxiety management system is presented. The patient anxiety management system may include a control module in communication with a medical device or a medical device interface; a trigger in communication with the control module and configured to deactivate the medical device or medical device interface; and a recording device, in communication with the control module, configured to play a recorded message to the patient, wherein the control module is configured to: activate a programmable time delay relay of the control module; disconnecting the medical device or medical device interface for a programmable timeframe; activate the recording device to play the recorded message during the programmable timeframe; and reset the medical device or medical device interface to an initial operation state by reconnecting but not reactivating the medical device or medical device interface.

In yet another example, a patient anxiety management system kit for retrofitting an existing system into a system for managing patient anxiety is provided. The patient anxiety management system kit may include: an interface comprising a time delay relay in communication with a solenoid for selectively deactivating an air powered handpiece; a trigger in communication with the interface configured to actuate the solenoid; and a sound module, in communication with the time delay relay and configured to play a recorded message to the patient, wherein the time delay relay is configured to: actuate the solenoid for a programmable or preprogrammed timeframe in order to shut off the air powered handpiece; activate the sound module to play the recorded message during the programmable or preprogrammed timeframe; and actuate the solenoid to reset the air powered handpiece to an initial operation state by allowing air to flow through the solenoid valve but not reactivating the air powered handpiece.

In one example, a method performed by a control module of a patient anxiety management system is presented. The method may include activating a programmable time delay relay in response to a patient triggering a patient control module configured to deactivate a medical device or medical device interface used by a dental professional during the dental procedure; deactivating the medical device or medical device interface for a programmable timeframe; activating the patient distraction module to play auditory stimuli during the programmable timeframe; and resetting the medical device or medical device interface to an initial operation state.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

The patient anxiety management system and the methods as disclosed herein are further described in terms of exemplary embodiments. These exemplary embodiments are described in detail with reference to the drawings, which have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. These embodiments are non-limiting exemplary embodiments, in which like reference numerals represent similar structures throughout the several views of the drawings. The drawings that accompany the detailed description can be briefly described as follows.

DETAILED DESCRIPTION OF THE INVENTION

Figure 1:
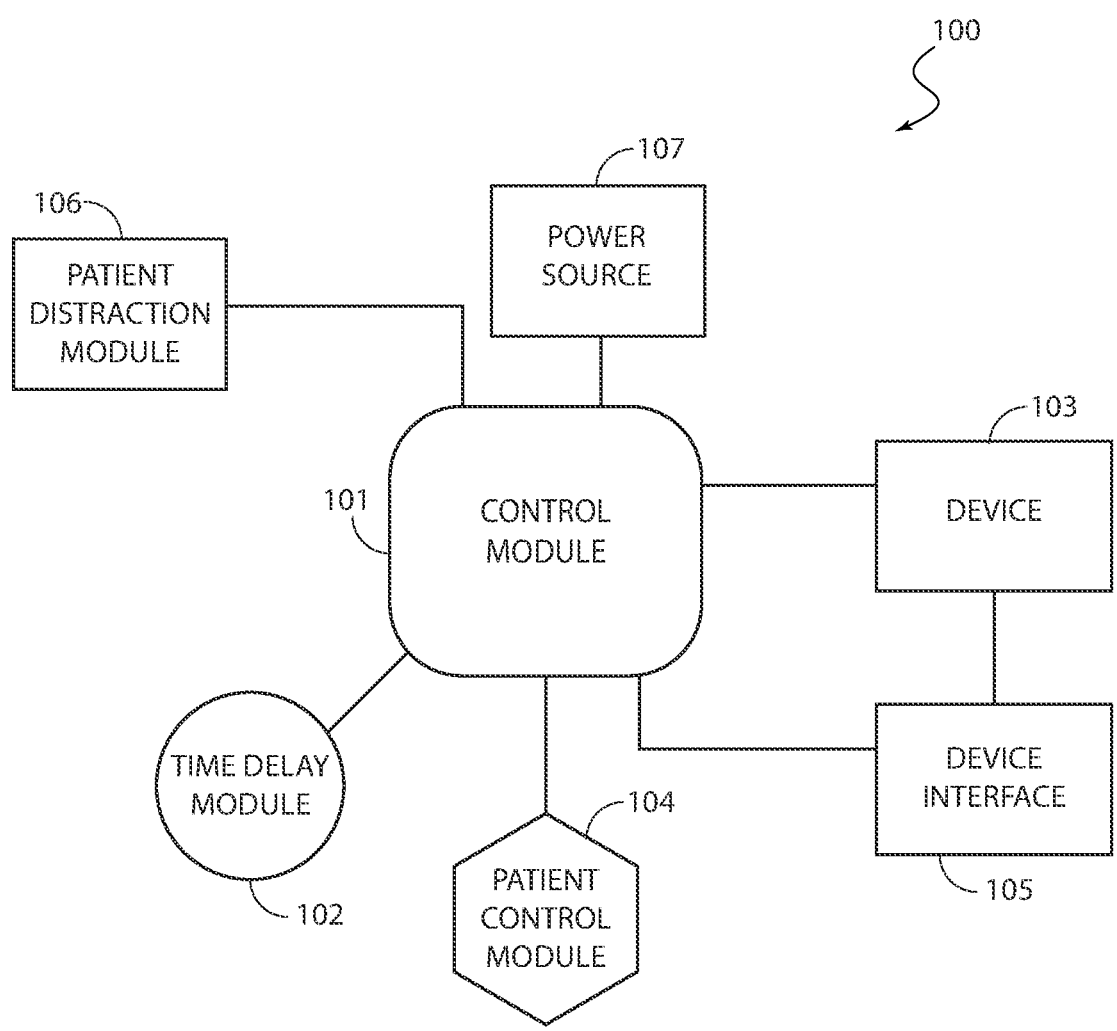
FIG. 1 illustrates a block diagram of a patient anxiety management system in accordance with some exemplary embodiments of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

The present disclosure relates to, among other things, a patient anxiety management system for managing patient anxiety during a dental procedure. Exemplary embodiments of the present disclosure are described with reference to the drawings for illustration purposes and are not intended to limit the scope of the present disclosure.

Turning now to the figures, FIG. 1 illustrates a block diagram of a patient anxiety management system in accordance with some exemplary embodiments of the present invention. More specifically, FIG. 1 depicts patient anxiety management system 100. In some exemplary embodiments, patient anxiety management system 100 may include a control module 101, a time delay module 102, a medical device 103 used by a dental professional during a dental procedure, a patient control module 104 that a patient can use to disactivate medical device 103 by way of a trigger mechanism, a dental device interface 105 that may be optionally and or additionally coupled to control module 101 and which is used by the dental professional to operate the dental device 103, a patient distraction module 106 that is configured to generate auditory stimuli such as a pleasant sound or a therapeutic recording, and a power source 107 for providing power to the various components of system 100 such as time delay module 102, device 103, and patient distraction module 106.

Control module 101 may take a variety of forms using known technologies. For example, and without limiting the scope of the present invention, control module 101 may comprise of circuitry with one or more processors or microprocessors configured to selectively direct power from power source 107 to device 103, device interface 105, and patient distraction module 106. In such embodiments, the one or more microprocessors of the circuitry may include executable instructions for performing various functions facilitated by system 100.

For example, and without limiting the scope of the present invention, control module 101 may include a circuitry with hardware comprising one or more sets of executable instructions for: activating a programmable time delay; deactivating a medical device or medical device interface for a predetermined or programmable timeframe; activating a patient distraction module such as a recording device or media player to play an auditory stimuli during the programmable timeframe; and resetting the medical device or medical device interface to an initial operation state. These instructions or functions will be discussed in more detail below with reference to other figures.

In some exemplary embodiments, control module 101 is a much simpler device without microprocessors or complex circuitry; instead, control module 101 may comprise a simple interface coupled to a time delay module 102, which may be a simple time delay relay with programmable or pre-programmed time ranges for selecting a timeframe or sets of time frames that may be adjusted via a typical potentiometer. In such embodiments the time delay relay configures control module 101 for: activating a programmable time delay upon activation of a trigger, such as a trigger of patient control module 102; deactivating a medical device or medical device interface for a programmable timeframe; activating a patient distraction module such as a recording device or media player to play an auditory stimuli during the programmable timeframe; and reset the medical device or medical device interface to an initial operation state. These functions will be discussed in more detail below with reference to other figures.

Time delay module 102 may be as simple as a time delay relay or may comprise of a programmable component of a more complex circuitry making up control module 101. In some exemplary embodiments, and without limiting the scope of the present invention, time delay module may be preprogrammed with a plurality of selectable time ranges and include a means of selecting and or adjusting a desired range for triggering an event, such as deactivation of device 103, deactivation of device interface 105, and or activation of patient distraction module 106. In some exemplary embodiments, and without limiting the scope of the present invention, time delay module may be programmable via a more sophisticated means such as a mobile application in communication with control module 101. In some exemplary embodiments, and without limiting the scope of the present invention, a user interface for controlling or selecting a time range may be accessible via a mobile application in communication with control module 101. In some exemplary embodiments, and without limiting the scope of the present invention, a user interface for controlling or selecting a time range may be part of control module 101.

Medical device 103 may be any number of medical devices or dental instruments used by a dental professional during a dental procedure. Typically, device 103 is the type of device that special needs patients such as patients suffering from dental anxiety may particularly fear, including handpieces that are water and or air driven, as well as other dental instruments commonly used by dental professionals such as lasers and or ultrasonic scalers. These types of medical devices tend to be a source of anxiety to patients because they involve high velocity moving parts due to their functions, including drilling, vibrating, cutting, and the like. As such, and in order to calm the patient, gain the patient's trust, and help the patient manage their anxiety, a dental professional may use the present invention to yield some sense of control to the anxious patient by allowing the patient to deactivate device 103 during a procedure in the manner explained below.

Patient control module 104 may be any type of interface or device suitable for a patient to use for interacting with control module 101, and more specifically for allowing the patient to deactivate medical device 103 and or device interface 105. Typically, this may be achieved by way of a trigger mechanism. For example, and in no way limiting the scope of the present invention, patient control module 104 may comprise a simple handheld device with a trigger that a patient can hold on to during the procedure. Under prior instructions from the dental professional, and during certain dental procedures, the patient may be provided with patient control module 104 so that if anxiety gets to be too much for the patient, they may activate the trigger in order to deactivate the device 103 that may be in use during the procedure. The idea is to allow the patient to gain confidence with the dental professional so that future visits become less stressful for the patient, and eventually the patient stops requiring use of the device. In this way, the patient learns to manage their anxiety and they learn to trust the dental practitioner.

In some exemplary embodiments, and without limiting the scope of the present invention, patient control module 104 comprises a handle with a button on top that may be pressed to deactivate device 103. In some exemplary embodiments, and without limiting the scope of the present invention, patient control module 104 comprises an ergonomic or easily held handle with a triggering device such as a Schmitt trigger. The triggering device is coupled to control module 101 and upon activation or being pressed by a patient, will activate time delay module 102 so that a preprogrammed or programmable timer is activated, and simultaneously or substantially simultaneously, or sequentially, device 103 and or device interface 105 may be deactivated or disconnected so as to stop control module 107 from driving power to device 103 and in that manner allowing the patient to cease operation of the device 103.

Dental device interface 105 may be any interface between device 103 and a dental professional such as a dentist, hygienist, or other qualified dental professional that may be performing a dental procedure on the patient using device 103. Typically, device interface 105 comprises a pedal. Of course, other interfaces that are suitable for medical devices in the dental field may be implemented without deviating from the scope of the present invention. For example, a device interface may comprise a mechanical pedal, or a wireless pedal without limiting the scope of the present invention. Similarly, in some embodiments, a controller for a laser may be optionally and or additionally coupled to control module 101 in order to control deactivation of dental device 103, for example when dental device 103 comprises a laser. Of course, in other exemplary embodiments, dental device 103 comprises a laser and device interface 105 comprises a pedal or wireless pedal; it should be noted that a wide range of components may be used without deviating from the scope of the present invention.

Patient distraction module 106 may be any device that is configured to generate auditory stimuli such as a pleasant sound or a therapeutic recording, such as a recorded message, sound, song, tune, or other audio recording. In some exemplary embodiments, patient distraction module 106 may comprise a sound recording device. In some exemplary embodiments, patient distraction module 106 may comprise a voice recording device. In some exemplary embodiments, patient distraction module 106 may comprise a module within control module 101, including hardware with a set of executable instructions for running a media player that generates or plays media files stored in a memory of the module and or a memory of control module 101. In some exemplary embodiments, patient distraction module 106 may comprise a module within control module 101, including a media player that may be accessed remotely via an application and or directly via a user interface accessible via control module 101. In some exemplary embodiments, a simple recording device with a microphone and speakers may be provided. In exemplary embodiments, hardware such as speakers or an interface for wired and or wireless speakers may be included to provide a means of playing the auditory stimuli.

Generally, although not necessarily, patient distraction module 106 may be activated simultaneously or substantially simultaneously upon activation of the patient control module 104. In some exemplary embodiments, upon a user triggering patient control module 104, patient distraction module 106 is activated simultaneously or substantially simultaneously with a deactivation or disconnecting of device 103 and or device interface 105. In some exemplary embodiments, upon a user triggering patient control module 104, patient distraction module 106 is activated sequentially or subsequent to a deactivation or disconnecting of device 103 and or device interface 105; if this is the case, a programmable timing may be preferred. Although an activation of patient distraction module 106 prior to a deactivation or disconnecting of device 103 and or device interface 105 could be possible without deviating from the scope of the present invention, delaying a deactivation of device 103 may not effective since the goal is to allow the patient to have a sense of control. Accordingly, in exemplary embodiments, activating patient control module 104 simultaneously deactivates device 103 (and or device interface 105) and activates patient distraction module 106.

Power source 107 may be any power source suitable for providing power to the various components of system 100 such as time delay module 102, device 103, and patient distraction module 106. In exemplary embodiments, power source 107 may comprise a simple wall outlet or electrical socket. In some exemplary embodiments, other components may be coupled to and between control module 101 and power source 107, including but not limited to a transformer, a toroidal transformer, a power supply unit or any other device suitable for controlling power supplied to system 100.

Generally, although not necessarily and only by way of providing an exemplary embodiment, upon a user depressing and or otherwise activating a trigger or the like of patient control module 104, medical device 103 and or device interface 105 (or both) are deactivated and or disconnected so that device 103 ceases to operate. Simultaneously, or substantially simultaneously, a recording device of patient distraction module 106, which is in communication with the control module 101, is activated so as to play an audible stimulus such as a recorded message to the patient during a programmable timeframe. After the programmable timeframe, system 100 resets but preferably does not activate again so that device 103 and or device interface 105 must be reactivated in order to continue an operation of device 103. In this way, system 100 does not automatically turn device 103 on again so as to avoid inadvertently injuring the patient. Accordingly, resetting the medical device 103 or medical device interface 105 to an initial operation state comprises of reconnecting but not reactivating the medical device 103 or medical device interface 105.

During this period, the dental professional may elect to provide instruction or address any concerns of the anxious patient. Once the patient is calm, system resets the medical device to an initial operation state by reconnecting but not reactivating the medical device so that the dental professional may resume the procedure when it is safe to proceed.

In accordance with some exemplary embodiments of the present invention, a patient anxiety management system 100 for managing patient anxiety during a dental procedure, may comprise: a control module 101 in communication with a medical device 103 or a medical device interface 105; a patient control module 104 in communication with the control module 101 and configured to deactivate the medical device 103 or medical device interface 105; and a patient distraction module 106, in communication with the control module 101, configured to provide the patient with auditory stimuli, wherein the control module is configured to: activate a programmable time delay relay; deactivate the medical device or medical device interface for a programmable timeframe; activate the patient distraction module to play the auditory stimuli during the programmable timeframe; and reset the medical device or medical device interface to an initial operation state.

Figure 2:
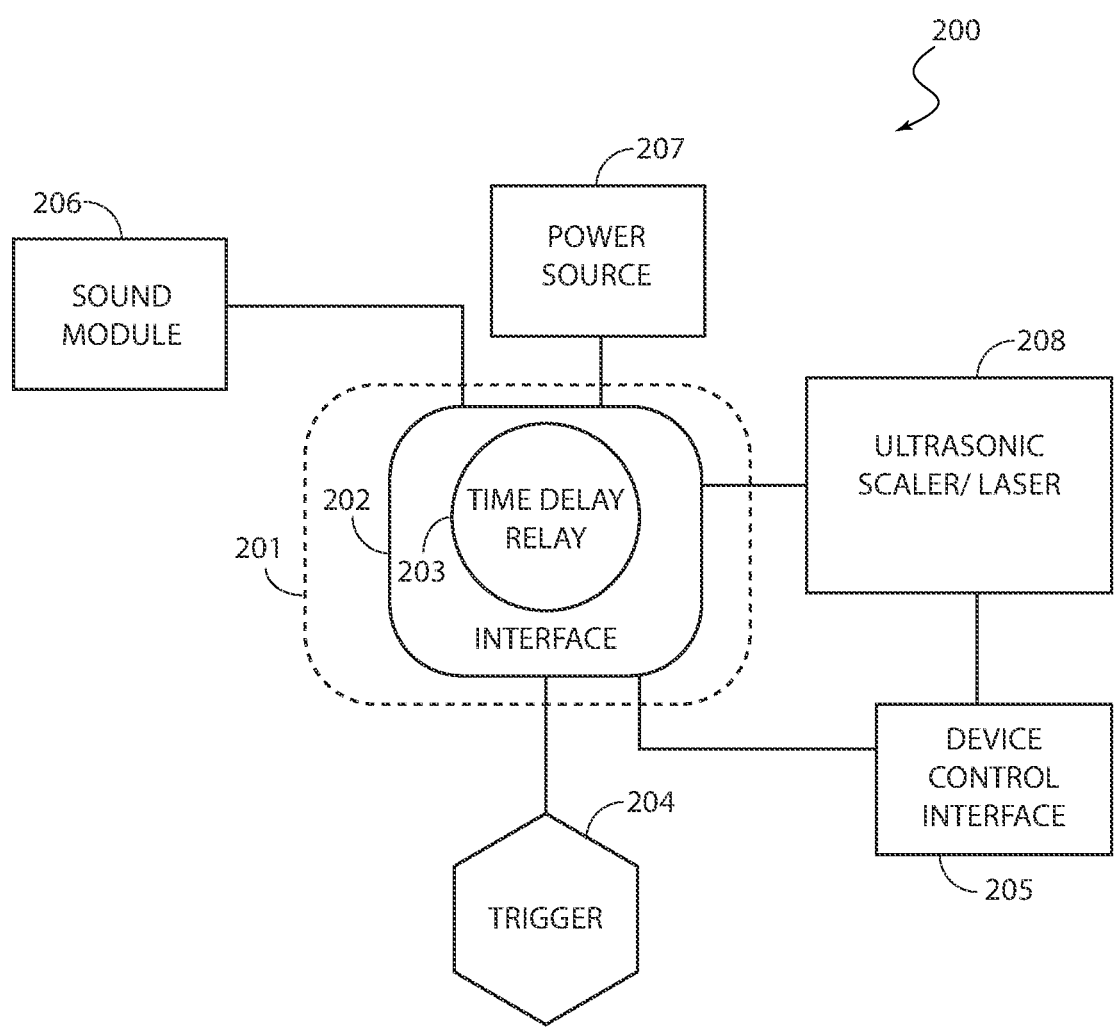
FIG. 2 illustrates a block diagram of a patient anxiety management system in accordance with some exemplary embodiments of the present invention.

Turning now to the next figure, FIG. 2 illustrates a block diagram of a patient anxiety management system in accordance with some exemplary embodiments of the present invention. More specifically, FIG. 2 depicts a patient anxiety management system 200, which is similar to system 100 except that this embodiment specifically includes a less complex control module, which may be coupled to a device such as an ultrasonic scaler or a laser in order to facilitate a patient's anxiety management during dental procedures performed using those devices. In some exemplary embodiments, patient anxiety management system 200 may include a control module 201, which comprises an interface 202 for connecting the various components coupled to control module 201 to a time delay relay 203. A patient control device such as trigger 204, device control interface 205, sound module 206, and medical device 208 such as an ultrasonic scaler or a laser may be coupled directly to interface 202, which is configured to selectively direct power from power source 207 to sound module 206, device 208 and or device control interface 205, and trigger 204.

In this embodiment, time delay relay 203 includes a pre-programmed time ranges for selecting a timeframe or sets of time frames that may be adjusted via a typical potentiometer. In such embodiments the time delay relay configures control module 201 for: activating a programmable time delay upon activation of trigger 204; deactivating medical device 208 or medical device interface 205 for a programmable timeframe; activating sound module 206, which is configured to play a recorded message during the programmable timeframe; and reset the medical device 208 or medical device interface 205 to an initial operation state by reconnecting but not reactivating the medical device 208 or medical device interface 205.

Accordingly, a patient anxiety management system for managing patient anxiety during a dental procedure, in accordance with some embodiments of the present invention, may include: a control module 201 in communication with a medical device 208 or a medical device interface 205; a trigger 204 in communication with the control module 201, and more specifically connected to a time delay relay via an interface 202. The control module 201 may be configured to deactivate medical device 208 or medical device interface 205 in order to allow a patent a sense of control of the medical device 208 being used by a dental professional during a dental procedure. Also coupled to the interface 201 is a sound module 206 including a recording device configured to play a recorded message to the patient. Upon the patient activating trigger 204, control module 201 is configured to: activate a programmable time delay set by time delay relay 203; disconnect (for a programmable timeframe) medical device 208 or medical device interface 206; activate the sound module 206 to play the recorded message during the programmable timeframe; and reset the medical device 208 and or medical device interface 205 to an initial operation state by reconnecting but not reactivating the medical device 208 and or medical device interface 205.

Figure 3:
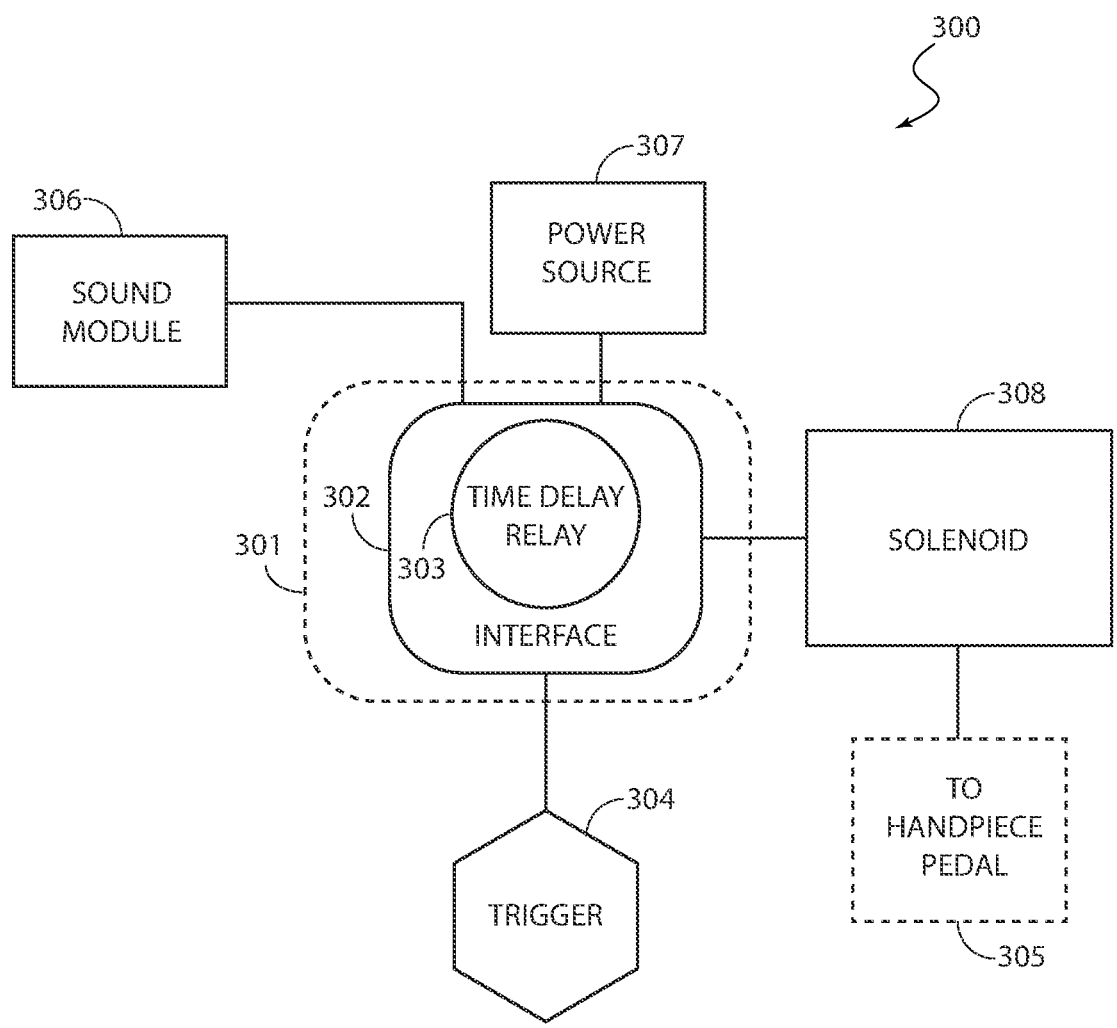
FIG. 3 illustrates a block diagram of a patient anxiety management system in accordance with some exemplary embodiments of the present invention.

Turning now to the next figure, FIG. 3 illustrates a block diagram of a patient anxiety management system in accordance with some exemplary embodiments of the present invention. More specifically, FIG. 3 depicts system or kit 300, which may be a kit that can be coupled to an existing air and or water supply unit in order to retrofit the existing unit so that it is suitable for a patient anxiety management system in accordance with the present invention.

In exemplary embodiments, kit 300 comprises control module 301, which includes an interface 303 for connecting the various components coupled to control module 301 to a time delay relay 303. A trigger 304 that allows a patient to activate the system as discussed above is coupled directly to interface 302 of control module 301, which is further directly coupled to a sound module 306 and a solenoid 308, as well as power source 307.

Solenoid 308 may include any type of solenoid suitable for directing a volume of air or water to drive handpiece 305. Generally, solenoid 308 includes a valve that selectively directs the water or air for driving handpiece 305. In an exemplary embodiment, without limiting the scope of the present invention, solenoid 308 selectively permits or restricts a flow of air for driving handpiece 305 so that actuation of solenoid 308 upon activation of trigger 304 will cause handpiece 305 to cease operation.

Accordingly, a patient anxiety management system for managing patient anxiety during a dental procedure, in accordance with some exemplary embodiments of the present invention, may include: an interface 303 comprising a time delay relay 303 in communication with a solenoid 308 for selectively deactivating an air powered handpiece 305; a trigger 304 in communication with the interface 302 configured to actuate the solenoid 308; and a sound module 306, in communication with the time delay relay 303 and configured to play a recorded message to the patient, wherein the time delay relay 303 is configured to: actuate the solenoid 308 for a programmable or preprogrammed timeframe in order to shut off the air powered handpiece 305; activate the sound module 306 to play the recorded message during the programmable or preprogrammed timeframe; and actuate, after the programmable timeframe, the solenoid 308 to reset the air powered handpiece 305 to an initial operation state by allowing air to flow through the solenoid 308 but not reactivating the air powered handpiece 305.

Figure 4:
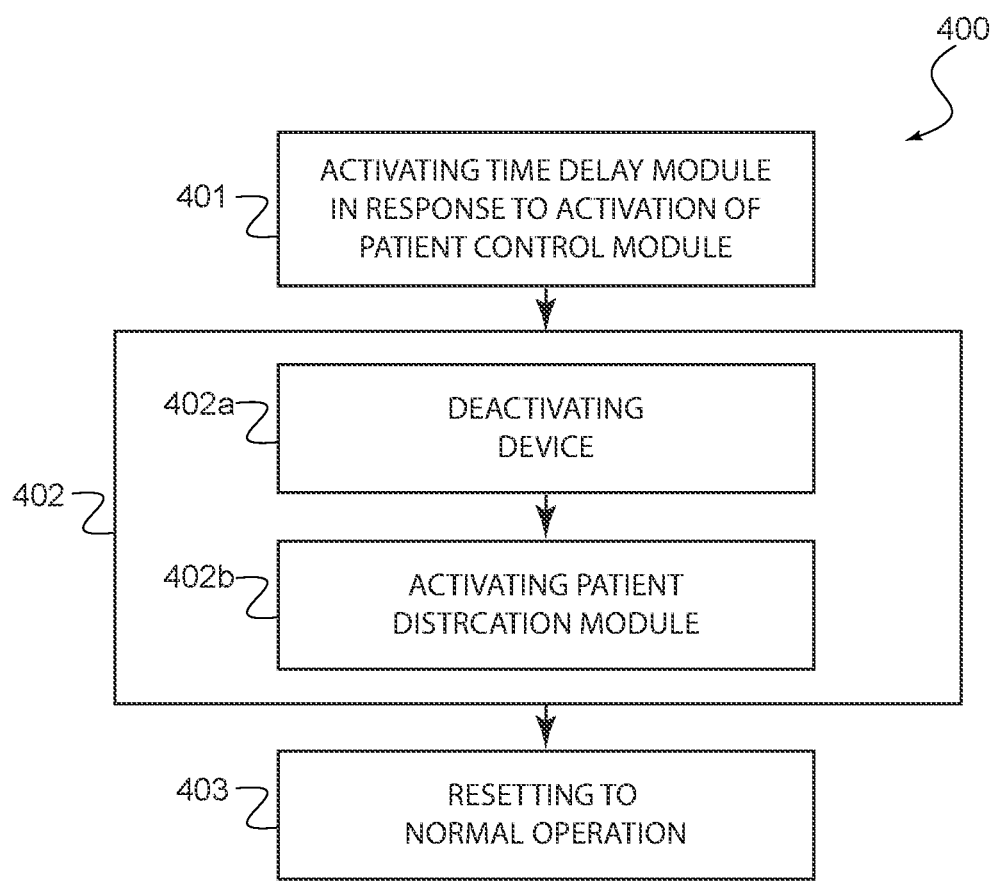
FIG. 4 illustrates a flow-chart of a method performed by a patient anxiety management system in accordance with some exemplary embodiments of the present invention.

The following figure, FIG. 4, illustrates a flow-chart of a method performed by a patient anxiety management system in accordance with some exemplary embodiments of the present invention. More specifically, FIG. 4 depicts method 400; although method 400 is exemplarily shown with a series of steps in one particular sequence, method 400 may include fewer or more steps, and or steps in alternative sequences, without deviating from the scope of the present invention.

In step 401, a patient may activate a time delay module in response to a perceived fear, anxiety, or discomfort they may be experiencing that induces them to want to momentarily stop the dental procedure. Accordingly, at step 401, a control module of a patient anxiety management system in accordance with some exemplary embodiments of the present invention may activate the time delay module in response to actuation of a trigger held by the patient during the dental procedure.

In step 402, the control module may take one or more steps without deviating from the scope of the present invention. In exemplary embodiments, this step 402 involves simultaneous or substantially simultaneous steps 402a and 402b. Step 402a includes deactivating or disconnecting a medical device such as a handpiece, a laser, an ultrasonic scaler, or any other motor-driven medical device that may be suitable for coupling with a system in accordance with the present invention. This step causes the dental device to stop immediately for the duration of a predetermined or programmable timeframe.

In some exemplary embodiments, this step may alternatively include deactivating a device interface rather than the device directly. For example, and without deviating from the scope of the present invention, step 402a may include deactivating a pedal that activates a handpiece or ultrasonic scaler, such that upon deactivation of the pedal, the handpiece or ultrasonic scaler will cease to function.

In some exemplary embodiments, this step 402a includes both deactivation of the device and the device interface. For example, and without limiting the scope of the present invention, step 402a may include deactivating a pedal that activates a handpiece or ultrasonic scaler, and deactivating the handpiece or ultrasonic scaler. This may be a desirable safety feature to ensure that a dental professional who may have kept their foot on the pedal (for example) does not inadvertently activate the device upon the expiration of the predetermined or preprogrammed timeframe. In such way, a resetting of the system can occur, as will be discussed below in reference to step 403.

Simultaneously, at Step 402b, the control module activates the patient distraction module, or sound module, in order to generate a therapeutic sound, or play a predetermined sound, such as a recording that is configured to soothe, calm, or instruct the patient for the duration of a predetermined or programmable timeframe. During this period, the dental professional may desire to instruct the patient so as to help the patient manage their anxiety and or address the patient's discomfort.

In step 403, once upon the termination of the preprogrammed or predetermined timeframe, the control module may reset the system such that the sound module is deactivated, and the device is again activated or rather reset such that it is again responsive to the dental professional activating the medical device once again. This resetting step prevents inadvertently injuring a patient by way of the device automatically engaging without the dental professional's intent to do.

Accordingly, in some exemplary embodiments, a method performed by a patient anxiety management system for managing patient anxiety during a dental procedure, may include the steps of: (401) activating a programmable time delay relay in response to a patient triggering a patient control module configured to deactivate a medical device or medical device interface used by a dental professional during the dental procedure; (402a) deactivating the medical device or medical device interface for a programmable timeframe; (402b) activating the patient distraction module to play auditory stimuli during the programmable timeframe; and (403) resetting the medical device or medical device interface to an initial operation state. In some exemplary embodiments, steps 402a and 402b are performed simultaneously or substantially simultaneously.

In exemplary embodiments, steps 402a and 402b are performed sequentially at specific time intervals wherein step 402a occurs immediately in response to the patient triggering the patient control module or trigger, and wherein 402b occurs within a predetermined or preprogrammed timeframe after step 402a.

Figure 5:
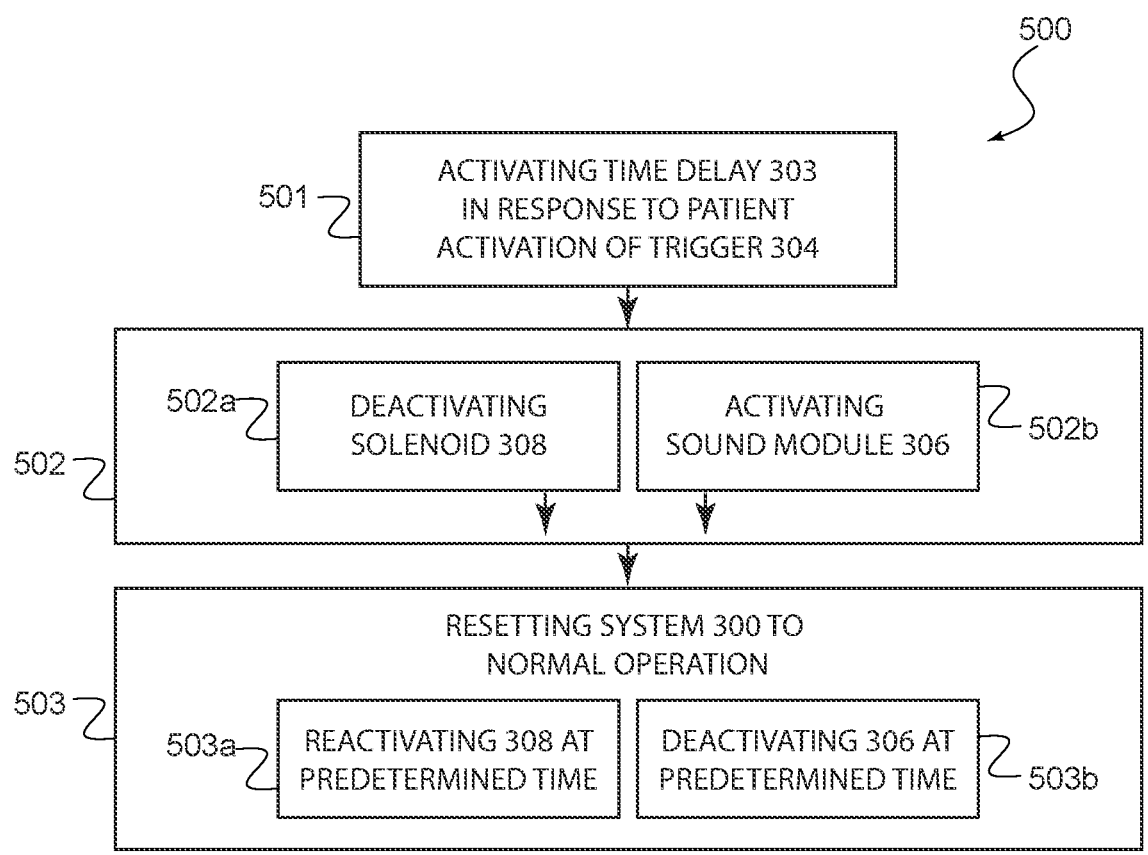
FIG. 5 illustrates a flow-chart of a method performed by a patient anxiety management system in accordance with some exemplary embodiments of the present invention.

Turning now to the next figure, FIG. 5 illustrates a flow-chart of a method performed by a patient anxiety management system in accordance with some exemplary embodiments of the present invention. More specifically, FIG. 5 depicts method 500, which includes the steps performed by a control module of a system comprising an air solenoid and air-driven handpiece, as is the case with the embodiment of FIG. 3. Although method 500 is exemplarily shown with a series of steps in one sequence, method 500 may include fewer or more steps, and or steps in alternative sequences, without deviating from the scope of the present invention.

In step 501, a patient may activate time delay relay 303 in response to a perceived fear, anxiety, or discomfort they may be experiencing that induces them to want to momentarily stop the dental procedure. Accordingly, at step 501, a control module 301 of a patient anxiety management system 300 may activate the time delay relay 303 in response to actuation of a trigger 304 held by the patient during the dental procedure.

In step 502, control module 301 may take one or more steps without deviating from the scope of the present invention. In exemplary embodiments, this step 502 involves simultaneous or substantially simultaneous steps 502a and 502b.

Step 502a includes deactivating handpiece pedal 305. This step causes the handpiece driven by the air input to the handpiece pedal 305 to stop immediately for the duration of a predetermined or programmable timeframe. Simultaneously, at step 502b, control module 301—by way of the time delay relay 303—activates sound module 306 to generate a therapeutic sound, or play a predetermined sound, such as a recording that is configured to soothe, calm, or instruct the patient for the duration of a predetermined or programmable timeframe. During this period, the dental professional may desire to instruct the patient so as to help the patient manage their anxiety and or address the patient's discomfort.

In step 303, upon the termination of the preprogrammed or predetermined timeframe, control module 301 may reset system 300. In this step, several sub-steps may occur, without deviating from or limiting the scope of the present invention. For example, step 503a, at a preset time during a predetermined or programmable timeframe, solenoid 308 may be reactivated. In step, sound module 306 may be deactivated. In this manner, system 300 is again reset such that it is again responsive to the dental professional activating the medical device once again.

Accordingly, in some exemplary embodiments, method 500 performed by patient anxiety management system 300, may include the steps of: (501) activating a programmable time delay relay 303 in response to a patient depressing trigger 304 configured to deactivate solenoid 308 driving air to a handpiece used by a dental professional during a dental procedure; (502a) deactivating solenoid 308 for a programmable timeframe; (502b) activating sound module 306 to play auditory stimuli during the programmable timeframe; and (503) resetting system 300 to an initial operation state. In some exemplary embodiments, steps 502a and 502b are performed simultaneously or substantially simultaneously. In exemplary embodiments, 503 involves steps 503a and 503b—automatically reactivating solenoid 308 and deactivating sound module 306 after termination of the predetermined timeframe.

Figure 6:
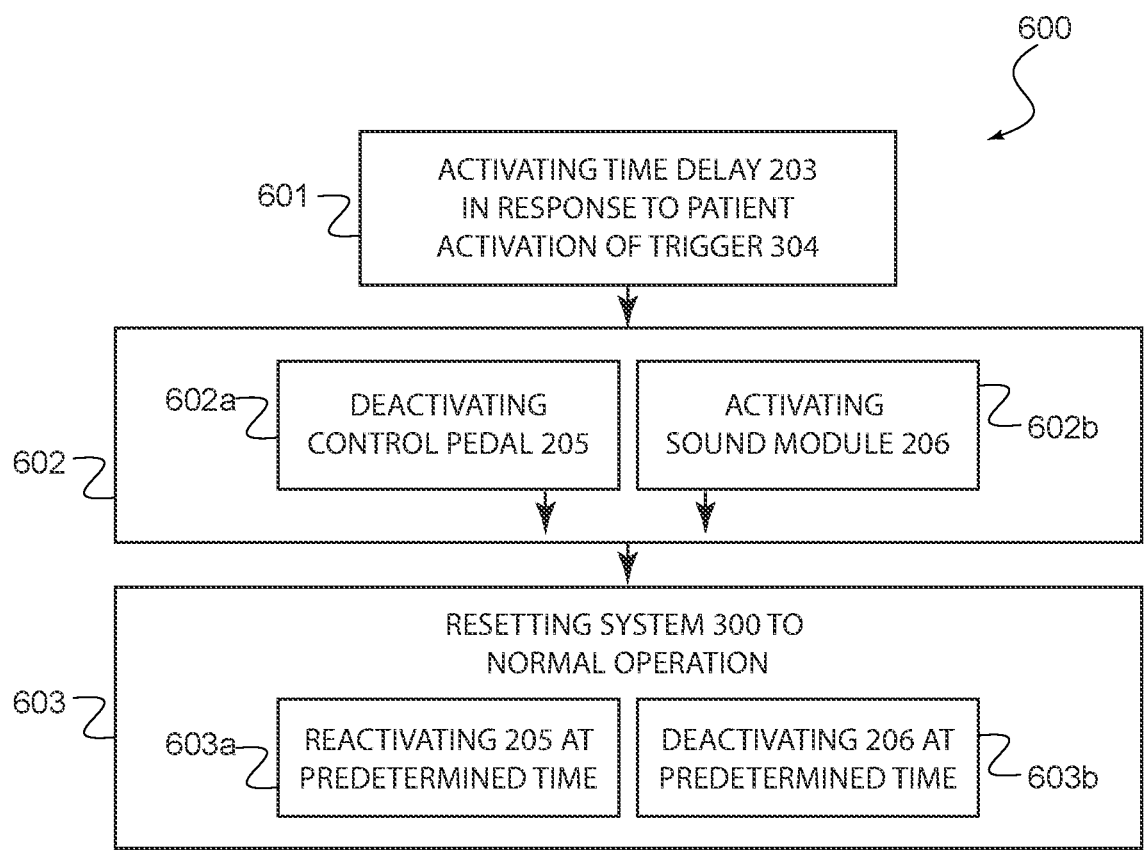
FIG. 6 illustrates a flow-chart of a method performed by a patient anxiety management system in accordance with some exemplary embodiments of the present invention.

Turning now to the next figure, FIG. 6 illustrates a flow-chart of a method performed by a patient anxiety management system in accordance with some exemplary embodiments of the present invention. More specifically, FIG. 6 depicts method 600, which includes the steps performed by a control module of a system comprising an ultrasonic scaler or laser controlled with an air control pedal. Although method 600 is exemplarily shown with a series of steps in one sequence, method 600 may include fewer or more steps, and or steps in alternative sequences, without deviating from the scope of the present invention.

In step 601, a patient may activate time delay relay 203 in response to actuation of a trigger 204 held by a patient during a dental procedure. In step 602, control module 201 may take one or more steps without deviating from the scope of the present invention. In exemplary embodiments, step 602 involves simultaneous or substantially simultaneous steps 602a and 602b.

Step 602a includes deactivating a control pedal 205 from device 208. This step causes the device 208 to stop immediately for the duration of a predetermined or programmable timeframe. Simultaneously, at step 602b, control module 201—by way of the time delay relay 203—activates sound module 206 to generate a therapeutic sound, or play a predetermined sound, such as a recording that is configured to soothe, calm, or instruct the patient for the duration of a predetermined or programmable timeframe. During this period, the dental professional may desire to instruct the patient so as to help the patient manage their anxiety and or address the patient's discomfort.

In step 603, upon the termination of the preprogrammed or predetermined timeframe, control module 201 may reset system 200. In this step, several sub-steps may occur, without deviating from or limiting the scope of the present invention. For example, step 603a, at a preset time during a predetermined or programmable timeframe, control pedal 205 may be reactivated. In step 603b, sound module 206 may be deactivated. In this manner, system 200 is again reset such that it is again responsive to the dental professional activating the medical device once again.

Accordingly, in some exemplary embodiments, method 600 performed by patient anxiety management system 200, may include the steps of: (601) activating a programmable time delay relay 203 in response to a patient depressing trigger 204 configured to deactivate control pedal 205 driving device 208 used by a dental professional during a dental procedure; (602a) deactivating control pedal 205 for a programmable timeframe; (602b) activating sound module 206 to play auditory stimuli during the programmable timeframe; and (603) resetting system 200 to an initial operation state. In some exemplary embodiments, steps 602a and 602b are performed simultaneously or substantially simultaneously. In exemplary embodiments, 603 involves steps 603a and 603b—automatically reactivating control pedal 205 and deactivating sound module 206 after termination of the predetermined timeframe.

Figure 7:
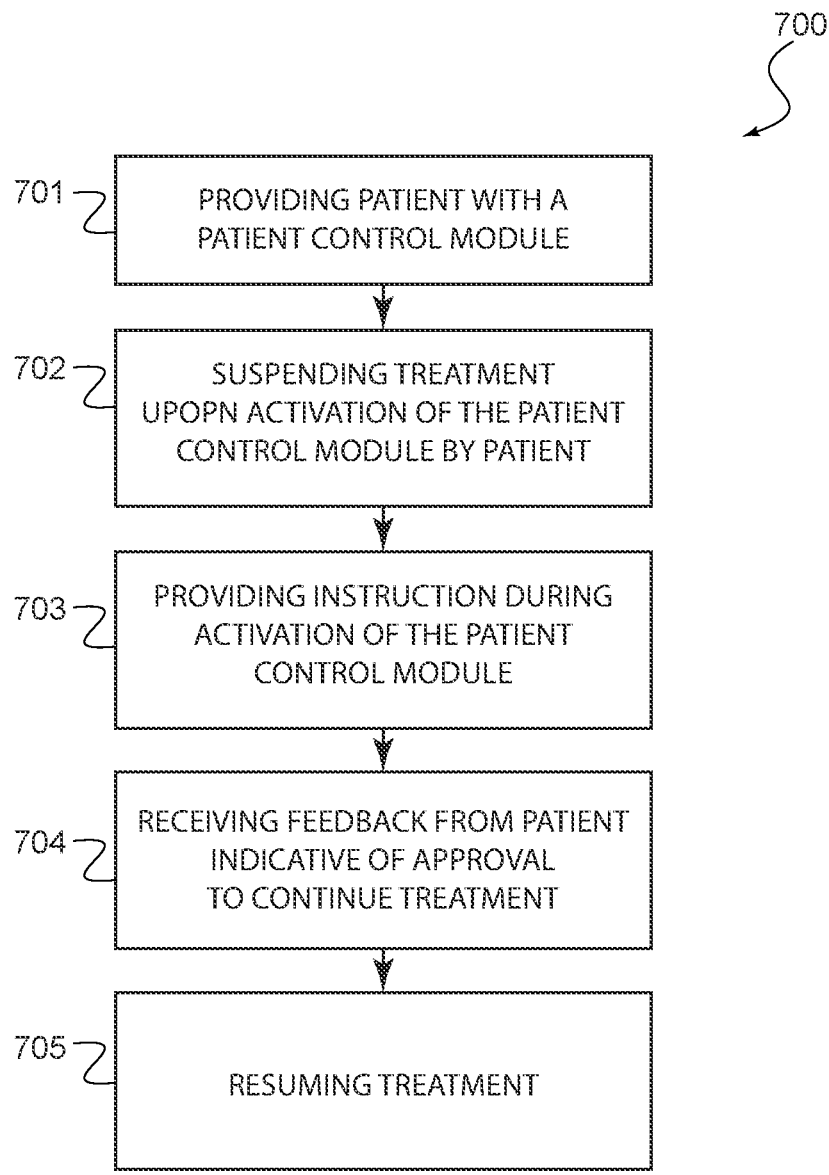
FIG. 7 illustrates a flow-chart of a method performed by a dental professional utilizing a patient anxiety management system in accordance with some exemplary embodiments of the present invention.

Turning now to the last figure, FIG. 7 illustrates a flow-chart of a method performed by a dental professional utilizing a patient anxiety management system in accordance with some exemplary embodiments of the present invention. More specifically, FIG. 7 depicts method 700, which includes the steps performed by an oral medicine practitioner using a system in accordance with the present invention. Although method 700 is exemplarily shown with a series of steps in one sequence, method 700 may include fewer or more steps, and or steps in alternative sequences, without deviating from the scope of the present invention.

In step 701, a practitioner may provide their patients with access to a patient control module such as a trigger device in accordance with the present invention. At this step, instructions on how the dental professional wants the user to utilize the device should be provided, as well as instructions on how to activate (depress) the provided trigger. Once the patient is set up with the trigger in hand, the practitioner may begin the dental procedure.

In step 702, the practitioner may be working on the patient when their device is shut off by way of the patient having depressed the trigger of the system. At this step, the practitioner will suspend treatment for a predetermined timeframe, which the practitioner will be well aware of.

In step 703, during the prescribed period, it may be desirable to instruct the patient or address any patient concerns. For example, and without limiting the scope of the present invention instruction may be provided such that the patient is allowed to gain confidence with the dental professional so that future visits become less stressful for the patient, and eventually the patient stops requiring use of the device.

Similarly, in step 704, the practitioner may receive feedback from the patient. In this way, the patient learns to manage their anxiety and they learn to trust the dental practitioner. once the patient is calm, the system will have automatically reset the medical device to an initial operation state by reconnecting but not reactivating the medical device so that the dental professional may resume the procedure when it is safe to proceed.

In step 705, the treatment can be resumed.

The foregoing detailed description has set forth various embodiments of the devices and/or processes by the use of diagrams, flowcharts, and/or examples. Insofar as such diagrams, flowcharts, and/or examples contain one or more functions and/or operations, it will be understood by those within the art that each function and/or operation within such diagrams, flowcharts, or examples may be implemented, individually and/or collectively, by a wide range of hardware, software, firmware, or virtually any combination thereof.

Those skilled in the art will recognize that it is common within the art to describe devices and/or processes in the fashion set forth herein, and thereafter use engineering practices to integrate such described devices and/or processes into other patient anxiety management systems. That is, at least a part of the devices and/or processes described herein may be integrated into a patient anxiety management system via a reasonable amount of experimentation.

The subject matter described herein sometimes illustrates different components contained within, or connected with, other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

All references, including but not limited to patents, patent applications, and non-patent literature are hereby incorporated by reference herein in their entirety.

A patient anxiety management system and method of use has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A method for managing patient anxiety during a dental procedure, comprising:
   prior to commencing the dental procedure, providing a patient with a trigger of a control module in communication with a medical device or a medical device interface, the trigger configured to deactivate the medical device or medical device interface;
   commencing the dental procedure after instructing the patient on a use of the trigger;
   suspending the dental procedure for a predetermined timeframe during a shut-off responsive to the patient activating the trigger, wherein suspending the dental procedure for the predetermined timeframe occurs simultaneously with auditory stimuli to soothe the patient, and the auditory stimuli is automatically activated by a patient distraction module in communication with the control module;
   during the predetermined timeframe, instructing the patient on a patient concern that produces patient anxiety; and
   subsequent to expiration of the predetermined timeframe, resuming the dental procedure.

2. The method of claim 1, wherein resuming the dental procedure occurs only after a reset of the medical device or medical device interface to an initial operation state by the control module.

3. The method of claim 1, further comprising providing preparing a therapeutic recording to use as the auditory stimuli.

4. The method of claim 1, wherein the auditory stimuli during the programmable timeframe comprises playing a recorded message.

5. The method of claim 1, wherein instructing the patient on the use of the trigger includes instructions on activating the trigger.

6. The method of claim 1, wherein instructing the patient on the use of the trigger includes instructions on how to hold the trigger.

7. The method of claim 1, wherein the step of resuming the dental procedure comprises resuming use of an ultrasonic scaler in communication with the control module.

8. The method of claim 1, wherein the step of resuming the dental procedure comprises resuming use of a laser in communication with the control module.

9. The method of claim 1, wherein the step of resuming the dental procedure comprises resuming use of a dental handpiece in communication with the control module.

10. The method of claim 1, wherein the step of resuming the dental procedure comprises resuming use of a pedal in communication with the control module.

11. The patient anxiety management system of claim 1, wherein the patient activating the trigger comprises the patient activating a handheld device with a pressable button.

12. A method performed by a patient anxiety management system for managing patient anxiety during a dental procedure, comprising:
    activating a programmable module in response to a patient triggering a patient pressing a handheld button that triggers control module configured to deactivate a medical device or medical device interface used by a dental professional during the dental procedure;
    deactivating the medical device or medical device interface for a programmable timeframe;
    activating the patient distraction module to play auditory stimuli during the programmable timeframe, and upon expiration of the programmable timeframe, deactivating the patient distraction module to stop playing the auditory stimuli; and
    resetting the medical device or medical device interface to an initial operation state.

13. The method of claim 9, wherein:
    the steps of deactivating the medical device or medical device interface for the programmable timeframe and activating the patient distraction module to generate auditory stimuli during the programmable timeframe occur simultaneously.

14. The method of claim 12, wherein:
    resetting the medical device or medical device interface to an initial operation state comprises of reconnecting but not reactivating the medical device or medical device interface.

15. The method of claim 12, wherein:
activating the patient distraction module to play auditory stimuli during the programmable timeframe comprises playing a recorded message.

\* \* \* \* \*